(12) United States Patent
Steinberg

(10) Patent No.: US 7,555,511 B2
(45) Date of Patent: Jun. 30, 2009

(54) METHODS FOR ADDRESSING INPUT DATA VALUES OF A FAST FOURIER TRANSFORM (FFT) CALCULATION

(75) Inventor: Moshe Steinberg, Hof HaCarmel (IL)

(73) Assignee: Ceva D.S.P. Ltd., Herzlia Pituach (IL)

( * ) Notice: Subject to any disclaimer, the term of this patent is extended or adjusted under 35 U.S.C. 154(b) by 666 days.

(21) Appl. No.: 10/882,682

(22) Filed: Jul. 2, 2004

(65) Prior Publication Data
US 2006/0004900 A1    Jan. 5, 2006

(51) Int. Cl.
*G06F 15/00* (2006.01)
(52) U.S. Cl. .................. 708/404; 708/403; 708/409
(58) Field of Classification Search .......... 708/403–409
See application file for complete search history.

(56) References Cited
U.S. PATENT DOCUMENTS 3,673,399 A   6/1972   Hancke et al.
3,871,577 A   3/1975   Avellar et al.
4,612,626 A   9/1986   Marchant
5,091,875 A * 2/1992   Wong et al. ............... 708/404
6,760,741 B1  7/2004   Vinitzky

FOREIGN PATENT DOCUMENTS

EP          0209446          1/1987

* cited by examiner

*Primary Examiner*—Lewis A Bullock, Jr.
*Assistant Examiner*—Michael Yaary
(74) *Attorney, Agent, or Firm*—Pearl Cohen Zedek Latzer, LLP

(57) ABSTRACT

A method for the generation of addresses of successive pairs of input data values of stages of a Fast Fourier Transform calculation stored contiguously in a memory includes initializing at most once per stage a first base address pointer to an address of a first input data value of an initial butterfly calculation of the stage and a second base address pointer to an address of a second input data value of the initial butterfly calculation, and initializing at most once per stage a first constant and a second constant. Pairs of input data values of successive butterfly calculations in the stage are then addressed using the first base address pointer, the second base address pointer, the first constant and the second constant.

3 Claims, 5 Drawing Sheets

STAGE 1

| | | | | INDEX | ADDRESS |
|---|---|---|---|---|---|
| AI[15:8] | AI[7:0] | AR[15:8] | AR[7:0] | ← 0 | 0000 0000 0000 0000 |
| AI[15:8] | AI[7:0] | AR[15:8] | AR[7:0] | ← 1 | 0000 0000 0000 0100 |
| AI[15:8] | AI[7:0] | AR[15:8] | AR[7:0] | ← 2 | 0000 0000 0000 1000 |
| AI[15:8] | AI[7:0] | AR[15:8] | AR[7:0] | ← 63 | 0000 0000 1111 1100 |
| BI[15:8] | BI[7:0] | BR[15:8] | BR[7:0] | ← 64 | 0000 0001 0000 0000 |
| BI[15:8] | BI[7:0] | BR[15:8] | BR[7:0] | ← 65 | 0000 0001 0000 0100 |
| BI[15:8] | BI[7:0] | BR[15:8] | BR[7:0] | ← 66 | 0000 0001 0000 1000 |
| BI[15:8] | BI[7:0] | BR[15:8] | BR[7:0] | ← 127 | 0000 0001 1111 1100 |
| AI[15:8] | AI[7:0] | AR[15:8] | AR[7:0] | ← 128 | 0000 0010 0000 0000 |
| AI[15:8] | AI[7:0] | AR[15:8] | AR[7:0] | ← 129 | 0000 0010 0000 0100 |
| AI[15:8] | AI[7:0] | AR[15:8] | AR[7:0] | ← 130 | 0000 0010 0000 1000 |
| BI[15:8] | BI[7:0] | BR[15:8] | BR[7:0] | ← 192 | 0000 0011 0000 0000 |
| BI[15:8] | BI[7:0] | BR[15:8] | BR[7:0] | ← 193 | 0000 0011 0000 0100 |
| BI[15:8] | BI[7:0] | BR[15:8] | BR[7:0] | ← 194 | 0000 0011 0000 1000 |

METHODS FOR ADDRESSING INPUT DATA VALUES OF A FAST FOURIER TRANSFORM (FFT) CALCULATION

BACKGROUND OF THE INVENTION

A digital signal processor (DSP) is a specialized microprocessor designed specifically for digital signal processing. Some digital signal processing tasks require the calculation of discrete Fourier Transforms. A particularly fast way to perform discrete Fourier Transforms is known as the Fast Fourier Transform (FFT) method. To perform the FFT quickly and efficiently, the DSP will likely include multiply-accumulate functionality. A program written using the instruction set of the DSP will enable the FFT calculation to be performed using the specialized hardware of the DSP.

The design of the DSP and its instruction set involves a balance between various competing goals, including reduction of the code size of programs, limits on the physical size of the DSP, and the speed of certain calculations.

BRIEF pESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 4 is an illustration of 32-bit complex input data values stored contiguously in a byte-addressable memory, according to some embodiments of the invention.

It will be appreciated that for simplicity and clarity of illustration, elements shown in the figures have not necessarily been drawn to scale. For example, the dimensions of some of the elements may be exaggerated relative to other elements for clarity.

DETAILED pESCRIPTION OF EMBODIMENTS OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Figure 1:
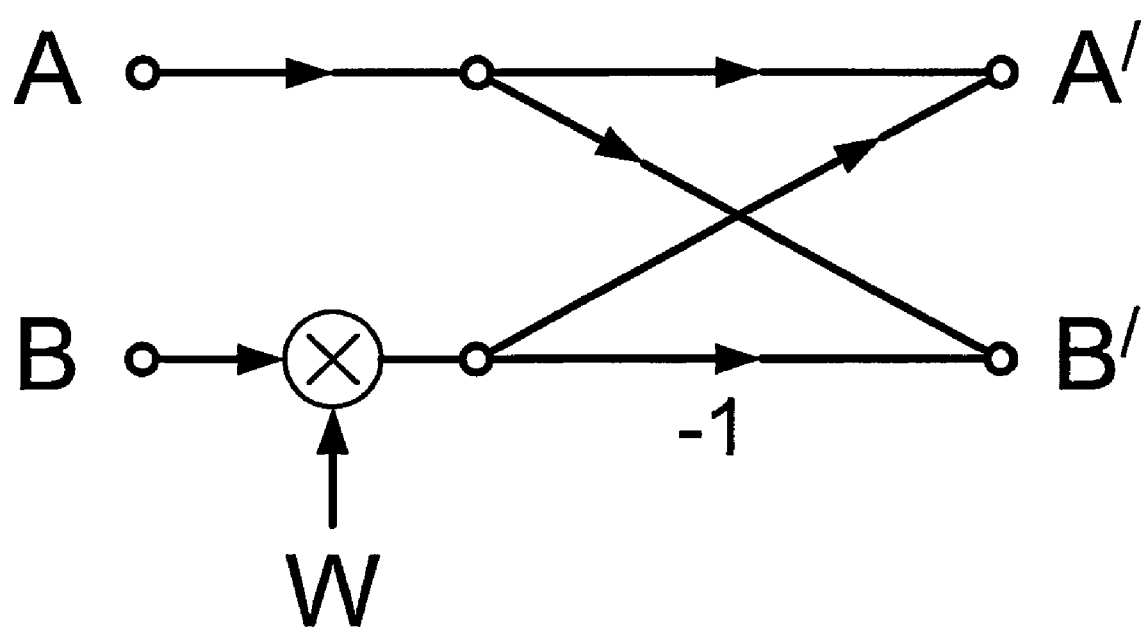
FIG. 1 is a prior art illustration of a butterfly calculation of a Fast Fourier Transform (FFT) calculation, helpful in understanding embodiments of the invention.

The Fast Fourier Transform (FFT) is a well-known method for carrying out a discrete Fourier Transform (DFT). The FFT method is realized by the repetition of butterfly calculations on pairs of input data values. FIG. 1 is an illustration of a butterfly calculation. For example, if the input data values are A, B, and the respective results of the butterfly operation are A', B', and the coefficient is W, the butterfly calculation can be expressed as follows:

$$A'=A+WB$$

$$B'=A-WB$$

Figure 2:
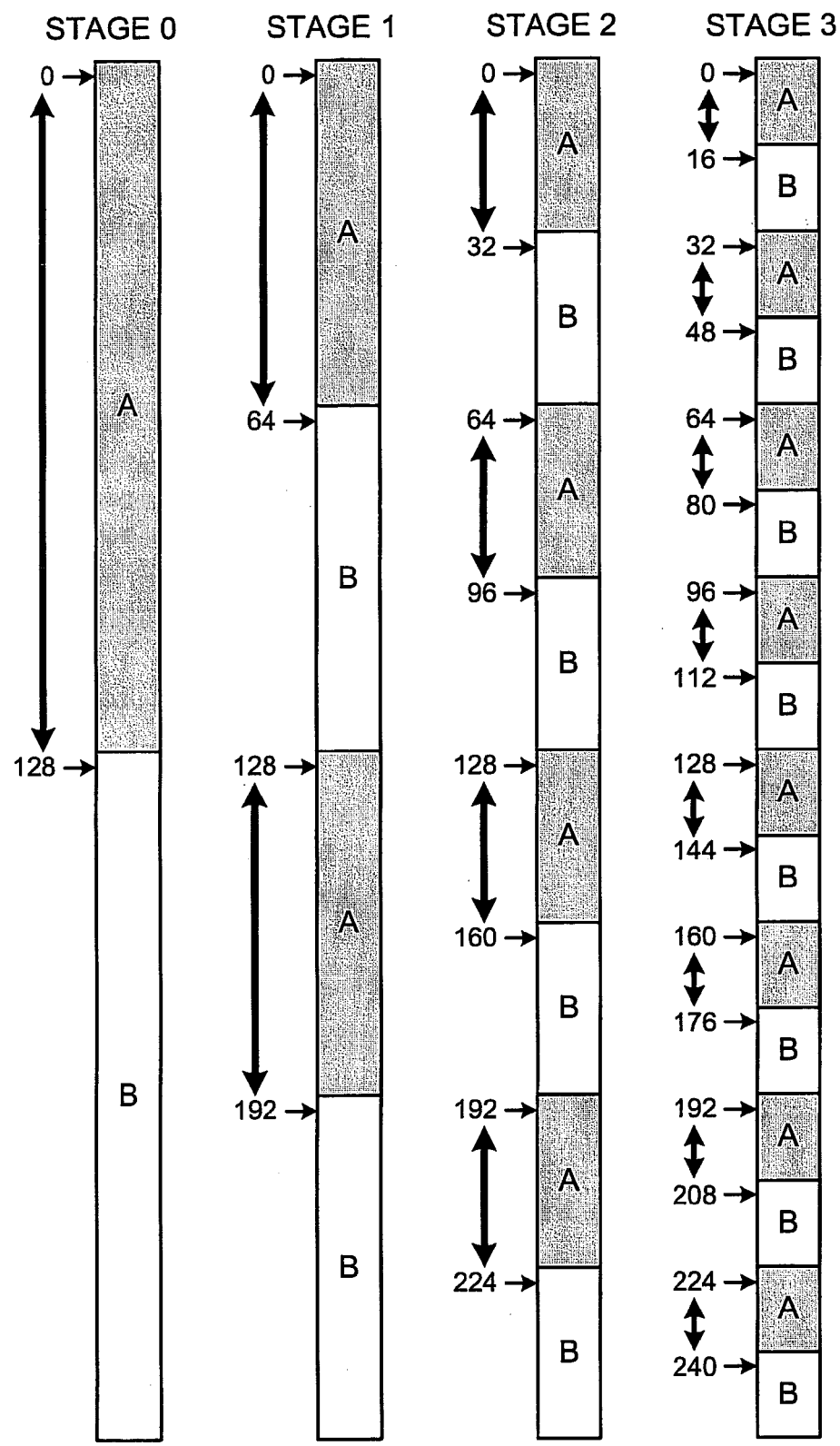
FIG. 2 is a prior art illustration of the grouping of pairs of input data values for butterfly calculations in the first four stages of an FFT calculation on 256 input data values, helpful in understanding embodiments of the invention.

Consider the example of an FFT on 256 input data values. The FFT calculation involves eight stages, the first four stages of which (Stages 0-3) are illustrated in FIG. 2 to show the grouping of pairs of input data values for butterfly calculations.

In the first stage (Stage 0), there is one group of pairs of input data values. As summarized in Table I below, "A" input data values indexed by 0-127 are paired successively with "B" input data values indexed by 128-255 for a total of 128 butterfly calculations. In other words, the input data value indexed by 0 is paired with the input data value indexed by 128 (as indicated by the double arrow), the input data value indexed by 1 is paired with the input data value indexed by 129, and so on. In the last butterfly calculation, the input data value indexed by 127 is paired with the input data value indexed by 255.

TABLE I grouping of pairs of input data values for Stage 0 (N = 256)

| Group | index of "A" input data values | index of "B" input data values | number of butterfly calculations |
|---|---|---|---|
| I | 0-127 | 128-255 | 128 |

Addressing the pairs of input data values may be accomplished by setting a pointer to the address of the input data value indexed by 0, another pointer to the address of the input data value indexed by 128, and advancing the pointers incrementally by the data width after each butterfly calculation. The data width is the change in the memory address from one input data value to the next. The results of the calculations of the first stage are also indexed by 0-255 and are the input to the second stage.

In the second stage (Stage 1), there are two groups of pairs of input data values. As summarized in Table II below, in the first group, "A" input data values indexed by 0-63 are paired successively with "B" input data values indexed by 64-127 for a subtotal of 64 butterfly calculations, and in the second group, "A" input data values indexed by 128-191 are paired successively with "B" input data values indexed by 192-255 for a subtotal of 64 butterfly calculations.

TABLE II grouping of pairs of input data values for Stage 1 (N = 256)

| Group | index of "A" input data values | index of "B" input data values | number of butterfly calculations |
|---|---|---|---|
| I | 0-63 | 64-127 | 64 |
| II | 128-191 | 192-255 | 64 |

Addressing the pairs of input data values in the first group may be accomplished by setting a pointer to the address of the input data value indexed by 0, another pointer to the address of the input data value indexed by 64, and advancing the pointers incrementally by the data width after each butterfly calculation. However, when the pointers point to the address of the input data values indexed by 63 and 127, respectively, advancing the pointers incrementally by the data width will not result in the appropriate address for the input data values of the next butterfly calculation, which is the first butterfly calculation for the second group. Conventionally, the pointers are initialized at least once per group in order to provide the appropriate addresses for the input data values of the butterfly calculations.

In the third stage (Stage 2), there are four groups of pairs of input data values, as summarized in Table III below.

TABLE III grouping of pairs of input data values for Stage 2 (N = 256)

| Group | index of "A" input data values | index of "B" input data values | number of butterfly calculations |
|---|---|---|---|
| I | 0-31 | 32-63 | 32 |
| II | 64-95 | 96-127 | 32 |
| III | 128-159 | 160-191 | 32 |
| IV | 192-223 | 224-255 | 32 |

In the fourth stage (Stage 3), there are eight groups of pairs of input data values, as summarized in Table IV below.

TABLE IV grouping of pairs of input data values for Stage 3 (N = 256)

| Group | index of "A" input data values | index of "B" input data values | number of butterfly calculations |
|---|---|---|---|
| I | 0-15 | 16-31 | 16 |
| II | 32-47 | 48-63 | 16 |
| III | 64-79 | 80-95 | 16 |
| IV | 96-111 | 112-127 | 16 |
| V | 128-143 | 144-159 | 16 |
| VI | 160-175 | 176-191 | 16 |
| VII | 192-207 | 208-223 | 16 |
| VIII | 224-239 | 240-255 | 16 |

Although not explicitly shown in FIG. 2, in the fifth stage (Stage 4), there are sixteen groups of pairs of input data values, in the sixth stage (Stage 5), there are thirty-two groups of pairs of input data values, in the seventh stage (Stage 6), there are sixty-four groups of pairs of input data values, and in the eighth and final stage (Stage 7), there are one hundred and twenty-eight groups of pairs of input data values.

Figure 3:
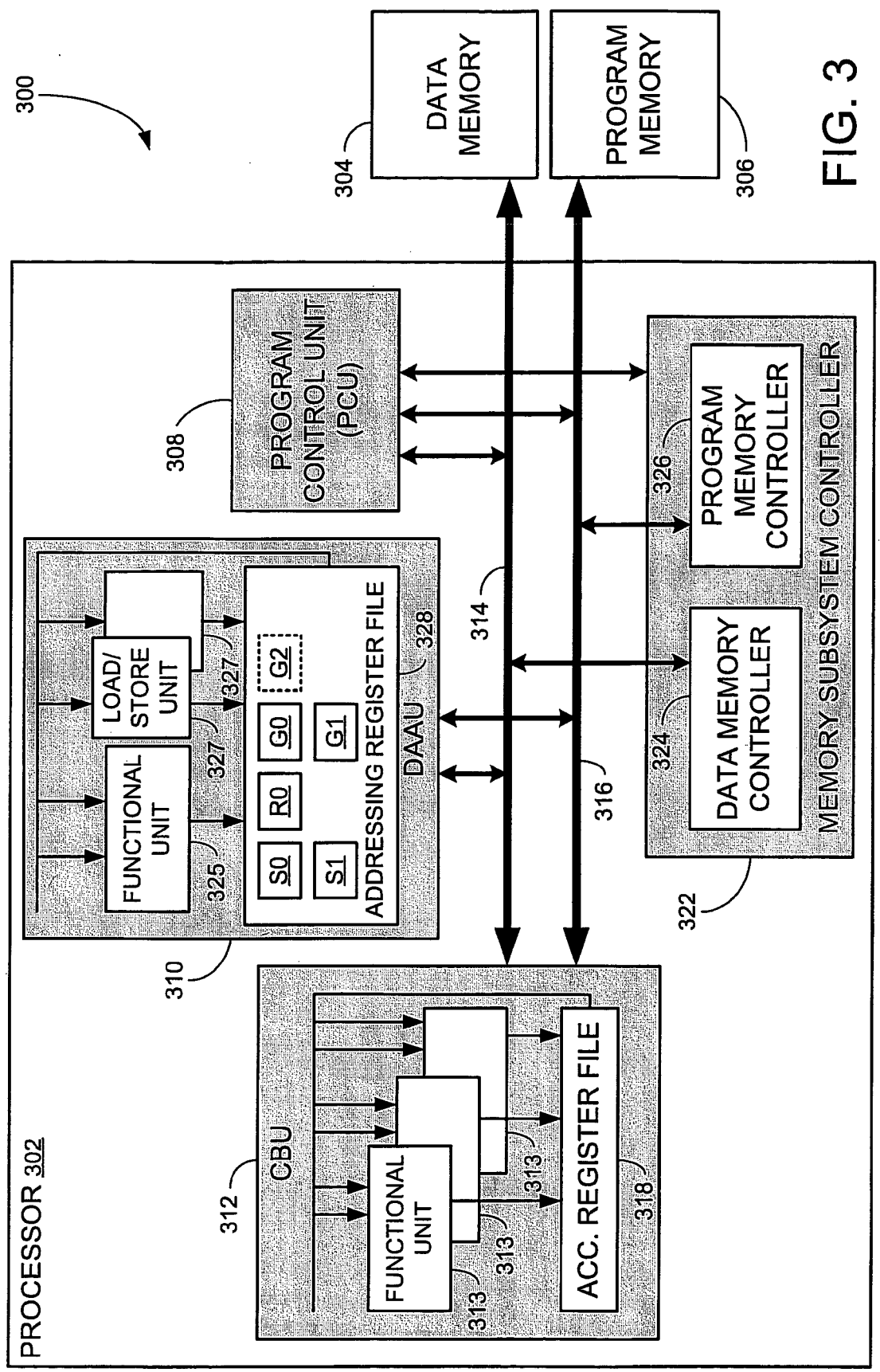
FIG. 3 is a block diagram of an exemplary apparatus including a processor coupled to a data memory and to a program memory, according to some embodiments of the invention.

The FFT calculation may be performed by a programmable processor or by a dedicated or stand-alone device. FIG. 3 is a block diagram of an exemplary apparatus 300 including a processor 302 coupled to a data memory 304 via a data memory bus 314 and to a program memory 306 via a program memory bus 316. For example, processor 302 may be a digital signal processor (DSP). Data memory 304 and program memory 306 may be the same memory. An exemplary architecture for processor 302 will now be described, although other architectures are also possible. Processor 302 includes a program control unit (PCU) 308, a data address and arithmetic unit (DAAU) 310, a computation and bit-manipulation unit (CBU) 312, and a memory subsystem controller 322. Memory subsystem controller 322 includes a data memory controller 324 coupled to data memory bus 314, and a program memory controller 326 coupled to program memory bus 316. PCU 308 is to retrieve, decode and dispatch instructions and is responsible for the correct program flow. CBU 312 includes an accumulator register file 318 and functional units 313, having any of the following functionalities or combinations thereof: multiply-accumulate (MAC), add/subtract, bit manipulation, arithmetic logic, and general operations. DAAU 310 includes an addressing register file 328, load/store units 327 capable of loading and storing from/to data memory 304, and a functional unit 325 having arithmetic, logical and shift functionality. Addressing register file 328 includes registers R0, S0, S1, G0, G1 and other registers.

In some embodiments, the data memory may be byte-addressable. FIG. 4 shows the input data values stored contiguously in a byte-addressable data memory prior to the second stage (Stage 1). Each input data value is a complex number represented by 32 bits. The coefficient W is also a complex number. The real part of an "A" input data value, AR, is stored in two bytes: AR[7:0] and AR[15:8], and the imaginary part of the "A" input data value, AI, is stored in another two bytes: AI[7:0] and AI[15:8]. Similarly, the real part of a "B" input data value, BR, is stored in two bytes: BR[7:0] and BR[15:8], and the imaginary part of the "B" input data value, BI, is stored in another two bytes: BI[7:0] and BI[15:8]. If the address of the input data value indexed by 0 is 0000 0000 0000 0000, then the address of the input data value indexed by 1 is 0000 0000 0000 0100. In other words, the data width of an input data value is 4, since the address is advanced by 4 bytes from one input data value to the next. (If the data memory was word-addressable, and each input data value was represented by 32 bits, then the data width would be 2.) Although the addresses shown are 16-bit addresses, other address sizes may be used, for example 32-bit addresses.

Figure 5:
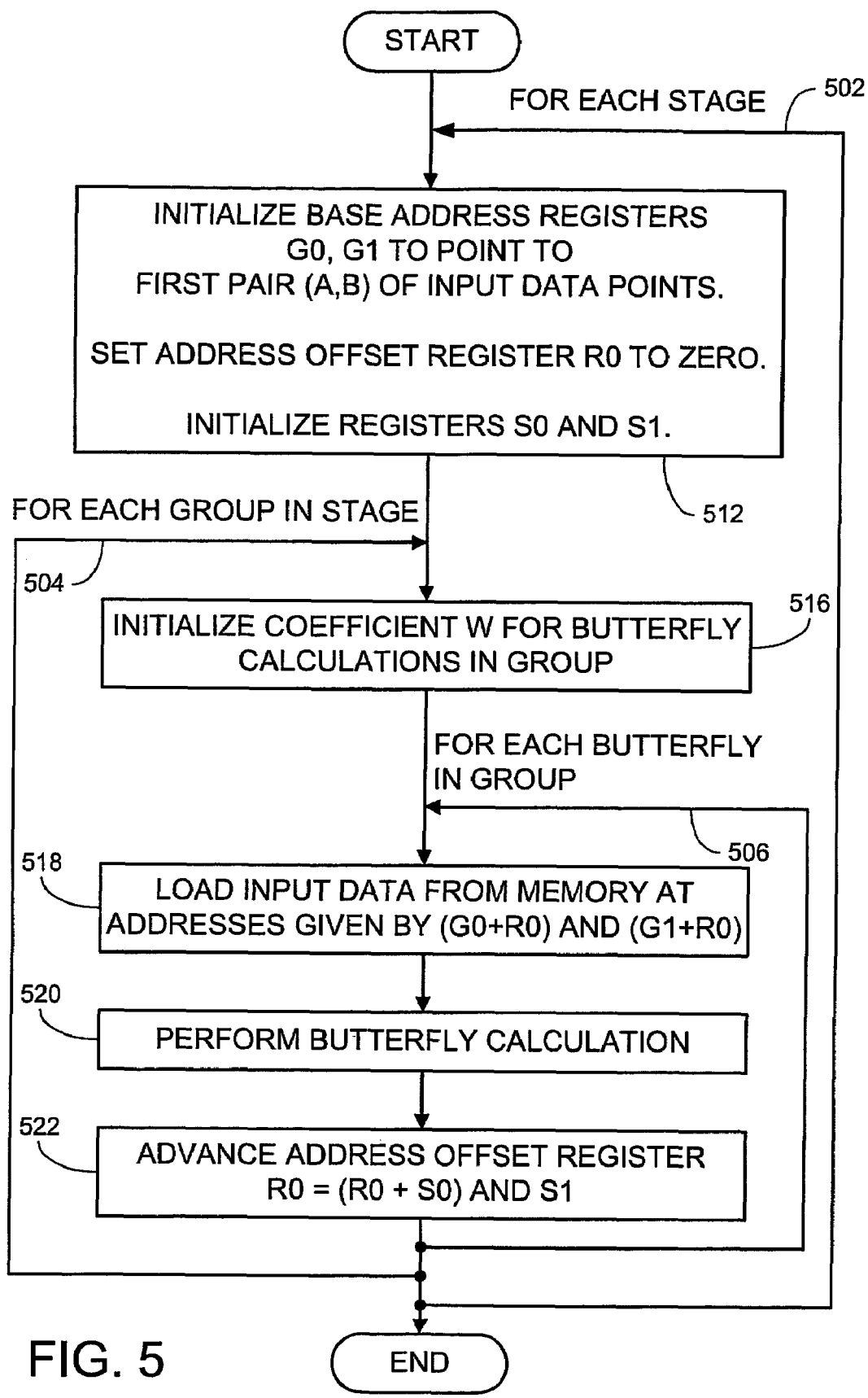
FIG. 5 is a simplified flowchart of a method for performing an FFT calculation, including the generation of addresses of input data values according to some embodiments of the invention.

FIG. 5 is a simplified flowchart of a method for performing an FFT calculation, including the generation of addresses of input data values according to some embodiments of the invention. A software program implementing the method of FIG. 5 may be stored in a program memory and executed by a processor coupled to the program memory. The method includes nested loops: a loop 502 over all the stages of the FFT calculation, a loop 504 over all the groups of a particular stage, and a loop 506 over all the butterfly calculations (pairs) of a particular group. In the example of 256 input data values, there are eight stages of the FFT calculation. In general, if the number of input data values is N, there are $\log_2 N$ stages of the FFT calculation, and each stage involves N/2 butterfly calculations.

Loop 502 begins by initializing the contents of base address registers G0 and G1 to point respectively to the addresses of the first A and B input data values to be paired for the initial butterfly calculation in that stage (block 512). In the example of the second stage (Stage 1) shown in FIG. 4, base address register G0 is initialized to 0000 0000 0000 0000 (the address corresponding to the input data value indexed by 0), while base address register G1 is initialized to 0000 0001 0000 0000 (the address corresponding to the input data value indexed by 64). If the output of each stage of the FFT calculation overwrites the input of the stage, then base address register G0 has a constant value for the entire FFT calculation (and therefore need not be initialized once per stage), and base address register G1 may be initialized once per stage by shifting base address register G1 by 1 bit to the right and making the most significant bit of base address register G1 equal 0 (a logical shift right). It is just an example that base address register G0 has the value 0000 0000 0000 0000.

Loop 502 also includes setting the contents of address offset register R0 to zero (block 512).

Loop 502 also includes initializing the contents of step registers S0 and S1 with constant values for that stage (block 512). The value for step register S1 is the logical NOT of $2^{(\log_2 N)+1-M}$, where N is the number of input data values counting from zero, and M is an index of the stage counting from zero. In the present example, N equals 256, and M equals 1, so S1 is initialized to 1111 1110 1111 1111. The value for step register S0 is the sum of $2^{(\log_2 N)+1-M}$ and the data width of an input data value. In the present example, N equals 256, M equals 1, and the data width equals 4, so step register S0 is initialized to 0000 0001 0000 0100. Block 512 may be performed by functional unit 325.

Loop 502 includes all of loop 504 for each of the groups in the stage. The number of groups in the first stage (Stage 0) is one, and doubles for each subsequent stage.

Loop 504 begins by initializing the coefficient W to the appropriate value to be used for butterfly calculations for the group (block 516). Block 516 may be performed by load/store unit 327, with the value of the coefficient W being stored in one of the registers of accumulator register file 318. Loop 504 includes all of loop 506 for each butterfly calculation in the group. In the first stage (Stage 0), the number of butterfly calculations in each group is half the number of input data values. The number of butterfly calculations in each group is halved for each subsequent stage.

Loop 506 includes loading the input data values A and B from the data memory at the addresses pointed to by pointers (G0+R0) and (G1+R0), respectively (block 518). Block 518 may be performed by load/store units 327, which support such an addressing mode, with the input data values being stored in registers of accumulator register file 318. Loop 506 also includes performing the butterfly calculation on the input data values (block 520). Block 520 may be performed by functional units 313 of CBU 312 having multiply-accumulate (MAC) functionality. Loop 506 also includes advancing address offset register R0, as will be explained in further detail hereinbelow (block 522). Block 522 may be performed by load/store units 327 Blocks 518, 520 and 522 may be performed in the order presented in FIG. 5, or in the order 518-522-520, or with blocks 518 and 522 in parallel, followed by block 520.

Once all of the butterfly calculations for a particular group have been completed, loop 504 is repeated for the next group in the stage. Once loop 504 has been completed for all of the groups of the stage, loop 502 is repeated for the next stage. Once loop 502 has been completed for all of the stages, the FFT calculation is complete.

Load (assembly instruction "ld") a double word (mode "{dw}") from the address G0+R0 to a first destination register of accumulator register file 318, then load a double word from the address (G1+R0) to a second destination register of accumulator register file 318 and advance R0 according to S0 and S1 (the plus sign "+" denotes addition and the ampersand "&" denotes the logical AND operation). It is natural to include post-modification of a pointer, such as the advancement of address offset register R0, in an assembly instruction.

The exemplary syntax given above uses two sequential instructions for loading the input data values for the butterfly calculation from memory. If memory restrictions do not prevent doing so, it may be possible to load the input data values stored at addresses (G0+R0) and (G1+R0) in parallel. If so, then one must ensure that the input data values are loaded before address offset register R0 is advanced. Alternatively, one may use a second address offset register having an identical value to address offset register R0 at all times that is advanced in the same manner that address offset register R0 is advanced. Alternatively, in a device or processor able to perform two multiply-accumulate calculations in parallel, one may use two address offset registers to address two pairs of input data values in order to perform two butterfly calculations in parallel.

The contents of address offset register R0 are advanced once per butterfly calculation. Moreover, the advancement operation applied to address offset register R0 uses constants that are updated or initialized only once per stage. Consequently, the contents of address offset register R0 need not be reinitialized for each group. This may simplify the coding of the FFT calculation, thus enabling a smaller code size, and may also reduce the cycle-count of the FFT calculation.

The contents of address offset register R0 are advanced by adding a first constant, the value of step register S0, to the register to generate a first sum, and then performing a logical AND operation on the first sum with a second constant, the value of step register S1.

For example, if address offset register R0 is initialized as above, and step registers S0 and S1 are initialized as above, then advancement of the contents of address offset register R0 according to block 522 will result in the following calculation:

| | |
|---|---|
| old R0 + | 0000 0000 0000 0000 = 0 |
| S0 | 0000 0001 0000 0100 |
| | 0000 0001 0000 0100 |
| AND S1 | 1111 1110 1111 1111 |
| new R0 | 0000 0000 0000 0100 = 4 |
| G0 | 0000 0000 0000 0000 = 0 = address of input data value indexed by 0 |
| G1 | 0000 0001 0000 0000 = 256 = address of input data value indexed by 64 |
| G0 + R0 | 0000 0000 0000 0100 = 4 = address of input data value indexed by 1 |
| G1 + R0 | 0000 0001 0000 0100 = 260 = address of input data value indexed by 65 |

For example, the advancement of address offset register R0 may be accomplished as post-modification of a pointer. For example, blocks 518 and 522 may be implemented using the following syntax:

ld{dw} (G0+R0), <destination1>
ld{dw} (G1+R0) +S0&S1, <destination2>

Therefore, applying the operation R0=(R0+S0) AND S1 results in (G0+R0) and (G1+R0) pointing to the addresses of the subsequent pair of input data values, namely the input data values indexed by 1 and 65.

In the next occurrence of loop 506, address offset register R0 will be advanced according to the following calculation:

```
old R0 +     0000 0000 0000 0100 = 4
S0           0000 0001 0000 0100
             0000 0001 0000 1000
AND S1       1111 1110 1111 1111
new R0       0000 0000 0000 1000 = 8
G0           0000 0000 0000 0000 = 0 = address of input data value indexed by 0
G1           0000 0001 0000 0000 = 256 = address of input data value indexed by 64
G0 + R0      0000 0000 0000 1000 = 8 = address of input data value indexed by 2
G1 + R0      0000 0001 0000 1000 = 264 = address of input data value indexed by 66
```

Therefore, applying the operation R0=(R0+S0) AND S1 results in (G0+R0) and (G1+R0) pointing to the addresses of the subsequent pair of input data values, namely the input data values indexed by 2 and 66.

At the last butterfly calculation of the first group, address offset register R0 equals 252. The advancement of address offset register R0 will be according to the following calculation:

```
old R0 +     0000 0000 1111 1100 = 252
S0           0000 0001 0000 0100
             0000 0010 0000 0000
AND S1       1111 1110 1111 1111
new R0       0000 0010 0000 0000 = 512
G0           0000 0000 0000 0000 = 0 = address of input data value indexed by 0
G1           0000 0001 0000 0000 = 256 = address of input data value indexed by 64
G0 + R0      0000 0010 0000 0000 = 512 = address of input data value indexed by 128
G1 + R0      0000 0011 0000 0000 = 768 = address of input data value indexed by 192
```

Therefore, even though the same operation is applied to address offset register R0 as before, the addresses pointed to by (G0+R0) and (G1+R0) jump to the beginning of the next group, as desired, so that (G0+R0) points to the address of the input data value indexed by 128, and (G1+R0) points to the address of the input data value indexed by 192.

Applying the same operation again results in the following calculation:

```
old R0 +     0000 0010 0000 0000 = 512
S0           0000 0001 0000 0100
             0000 0011 0000 0100
AND S1       1111 1110 1111 1111
new R0       0000 0010 0000 0100 = 516
G0           0000 0000 0000 0000 = 0 = address of input data value indexed by 0
G1           0000 0001 0000 0000 = 256 = address of input data value indexed by 64
G0 + R0      0000 0010 0000 0100 = 516 = address of input data value indexed by 129
G1 + R0      0000 0011 0000 0100 = 772 = address of input data value indexed by 193
```

Therefore, applying the operation R0=(R0+S0) AND S1 results in (G0+R0) and (G1+R0) pointing to the addresses of the subsequent pair of input data values, namely the input data values indexed by 129 and 193.

The initialization of step register S1 once per stage may involve setting the step register to the logical NOT of $2^{(\log_2 N)+1}$ in the first stage, and then for each subsequent stage, shifting S1 to the right 1 bit and making the most significant bit of step register S1 equal 1 (an arithmetic shift right). The initialization of step register S0 may be facilitated by the use of an additional register G2 in addressing register file 328. In the first stage, the contents of register G2 may be set to $2^{(\log_2 N)+1}$. In each subsequent stage, the contents of register G2 may be shifted to the right 1 bit, while making the most significant bit of register G2 equal 0 (a logical shift right) At each stage, functional unit 325 may add the contents of G2 and the data width and store the sum in step register S0.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A processor for digital signal processing comprising: a data address unit including at least:

a first base address register to store an address of a first input data value of an initial butterfly calculation of a particular stage of a Fast Fourier Transform calculation;

a second base address register to store an address of a second input data value of the initial butterfly calculation;

a first step register to store the sum of a data width of an input data value and the value $2^{(\log_2 N)-1+M}$, where N is the number of input data values counting from zero and M is an index of the stage counting from zero;

a second step register to store the logical NOT of the value $2^{(\log_2 N)-1+M}$;

a scalar unit to update the contents of an address offset register once per butterfly calculation by adding the contents of the offset address register to the contents of the first step register to produce a first sum and then performing a logical AND operation on the first sum with the contents of the second step register;

an additional register to store the value $2^{(\log_2 N)-1}$ for the first stage of the Fast Fourier Transform calculation; and a shift unit to perform a logical shift right by 1 bit to the additional register at most once per stage of the Fast Fourier Transform calculation, and to perform an arithmetic shift right by 1 bit to the second step register at most once per stage of the Fast Fourier Transform calculation, wherein once per stage, the scalar unit is to add the contents of the additional register to the data width to produce a result and to store the result in the first step register.

2. The A device for digital signal processing comprising: a data address unit including at least:

a first base address register to store an address of a first input data value of an initial butterfly calculation of a particular stage of a Fast Fourier Transform calculation;

a second base address register to store an address of a second input data value of the initial butterfly calculation;

a first step register to store the sum of a data width of an input data value and the value $2^{(\log_2 N)-1+M}$ where N is the number of input data values counting from zero and M is an index of the stage counting from zero;

a second step register to store the logical NOT of the value $2^{(\log_2 N)-1+M}$;

a scalar unit to update the contents of an address offset register once per butterfly calculation by adding the contents of the offset address register to the contents of the first step register to produce a first sum and then performing a logical AND operation on the first sum with the contents of the second step register;

an additional register to store the value $2^{(\log_2 N)-1}$ for the first stage of the Fast Fourier Transform calculation; and a shift unit to perform a logical shift right by 1 bit to the additional register at most once per stage of the Fast Fourier Transform calculation, and to perform an arithmetic shift right by 1 bit to the second step register at most once per stage of the Fast Fourier Transform calculation, wherein once per stage, the scalar unit is to add the contents of the additional register to the data width to produce a result and to store the result in the first step register.

3. An apparatus for digital signal processing comprising:

a memory to store contiguously input data values of a Fast Fourier Transform calculation; and a processor including at least a data address unit, the data address unit including at least:

a first base address register to store an address of a first input data value of an initial butterfly calculation of a particular stage of a Fast Fourier Transform calculation;

a second base address register to store an address of a second input data value of the initial butterfly calculation;

a first step register to store the sum of a data width of an input data value and the value $2^{(\log_2 N)-1+M}$, where N is the number of input data values counting from zero and M is an index of the stage counting from zero;

a second step register to store the logical NOT of the value $2^{(\log_2 N)-1+M}$;

a scalar unit to update the contents of an address offset register once per butterfly calculation by adding the contents of the offset address register to the contents of the first step register to produce a first sum and then performing a logical AND operation on the first sum with the contents of the second step register;

an additional register to store the value $2^{(\log_2 N)-1}$ for the first stage of the Fast Fourier Transform calculation; and a shift unit to perform a logical shift right by 1 bit to the additional register at most once per stage of the Fast Fourier Transform calculation, and to perform an arithmetic shift right by 1 bit to the second step register at most once per stage of the Fast Fourier Transform calculation, wherein once per stage, the scalar unit is to add the contents of the additional register to the data width to produce a result and to store the result in the first step register.

* * * * *